(12) United States Patent
Fujita et al.

(10) Patent No.: US 8,309,000 B2
(45) Date of Patent: Nov. 13, 2012

(54) METHOD FOR MANUFACTURING MICROLENS AND METHOD FOR MANUFACTURING SOLID-STATE IMAGE SENSOR

(75) Inventors: Goro Fujita, Kanagawa (JP); Seiji Kobayashi, Kanagawa (JP); Kimihiro Saito, Saitama (JP); Shingo Imanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 12/358,737

(22) Filed: Jan. 23, 2009

(65) Prior Publication Data

US 2009/0189302 A1  Jul. 30, 2009

(30) Foreign Application Priority Data

Jan. 24, 2008 (JP) ................ P2008-013492
Jun. 12, 2008 (JP) ................ P2008-153760

(51) Int. Cl.
*B29D 11/00* (2006.01)
(52) U.S. Cl. ....... 264/2.5; 264/1.32; 264/1.36; 264/1.37
(58) Field of Classification Search ............. 264/1.32, 264/1.36, 1.37, 2.5
See application file for complete search history.

(56) References Cited

U.S. PATENT DOCUMENTS

| | | | | |
|---|---|---|---|---|
| 6,570,155 B1 * | 5/2003 | Prior et al. | ...... | 250/311 |
| 6,829,087 B2 * | 12/2004 | Freese et al. | ...... | 359/455 |
| 2003/0183875 A1 * | 10/2003 | Isobe et al. | ...... | 257/347 |
| 2005/0074616 A1 * | 4/2005 | Harchanko et al. | ...... | 428/413 |
| 2005/0260388 A1 | 11/2005 | Lai | | |
| 2006/0063351 A1 * | 3/2006 | Jain | ...... | 438/455 |
| 2007/0122718 A1 * | 5/2007 | Mizusako et al. | ...... | 430/5 |

FOREIGN PATENT DOCUMENTS

| | | |
|---|---|---|
| JP | 09-323353 | 12/1997 |
| JP | 2004-170628 | 6/2004 |
| JP | 2005-181699 | 7/2005 |
| JP | 2006-058720 | 3/2006 |
| JP | 2006-072349 | 3/2006 |
| JP | 2006-201692 | 8/2006 |
| JP | 2007-025305 | 2/2007 |
| JP | 2008-500599 | 1/2008 |

OTHER PUBLICATIONS

Japanese Office Action issued on Dec. 15, 2009 for corresponding Japanese Patent Application 2008-153760.
Toshikiyo, Kimiaki; et al., "A MOS Image Sensor with Microlenses Built by Sub-Wavelength Patterning", Feb. 14, 2007, 2007 IEEE11 International Solid-State Circuits Conference, Session 28 / Image Sensors / 2W88.

* cited by examiner

*Primary Examiner* — Yogendra Gupta
*Assistant Examiner* — Jeremiah Smith
(74) *Attorney, Agent, or Firm* — K&L Gates LLP

(57) ABSTRACT

A method for manufacturing a microlens includes forming a microlens by pressing a microlens mold having a reverse shape of a microlens formed therein on a microlens-forming film formed on a substrate to transfer the reverse shape of the microlens to the microlens-forming film. The microlens mold is formed by irradiating an inorganic resist film which is formed on a mold substrate with exposure light by relative two-dimensional scanning, and etching an exposed region of the inorganic resist film to form the reverse shape of the microlens. The irradiation intensity of the exposure light is adjusted to correspond to the depth of the reverse shape of the microlens from the surface of the inorganic resist film on the basis of profile data of the reverse shape of the microlens.

9 Claims, 15 Drawing Sheets

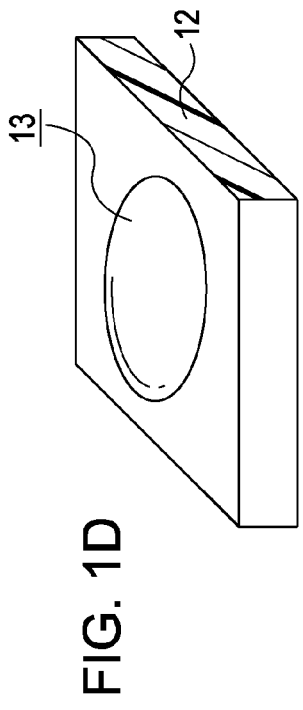
FIG. 1A
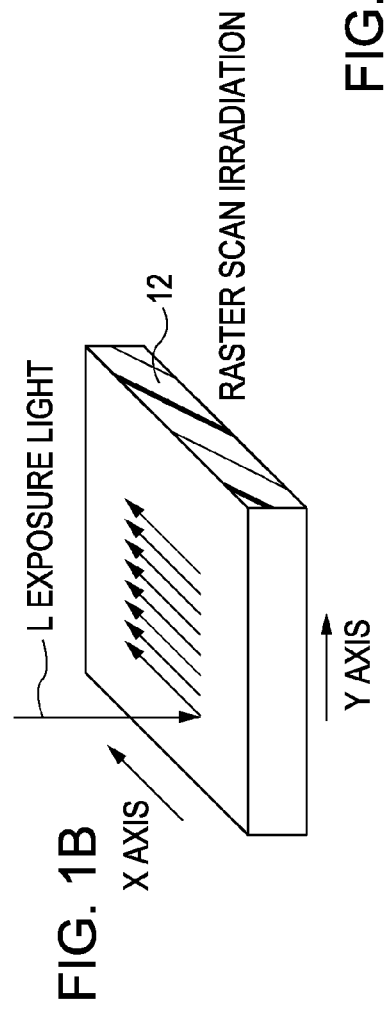
FIG. 1B
FIG. 1C
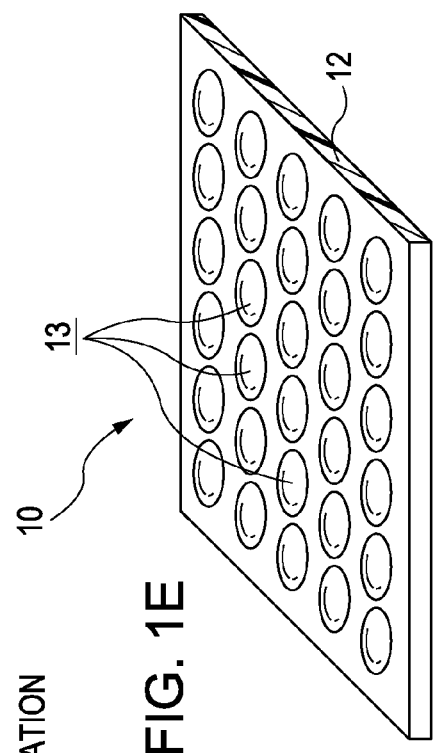
FIG. 1D
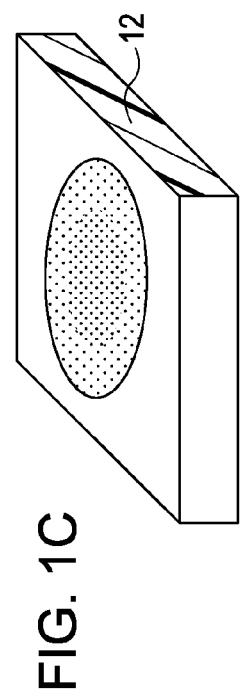
FIG. 1E

FIG. 2

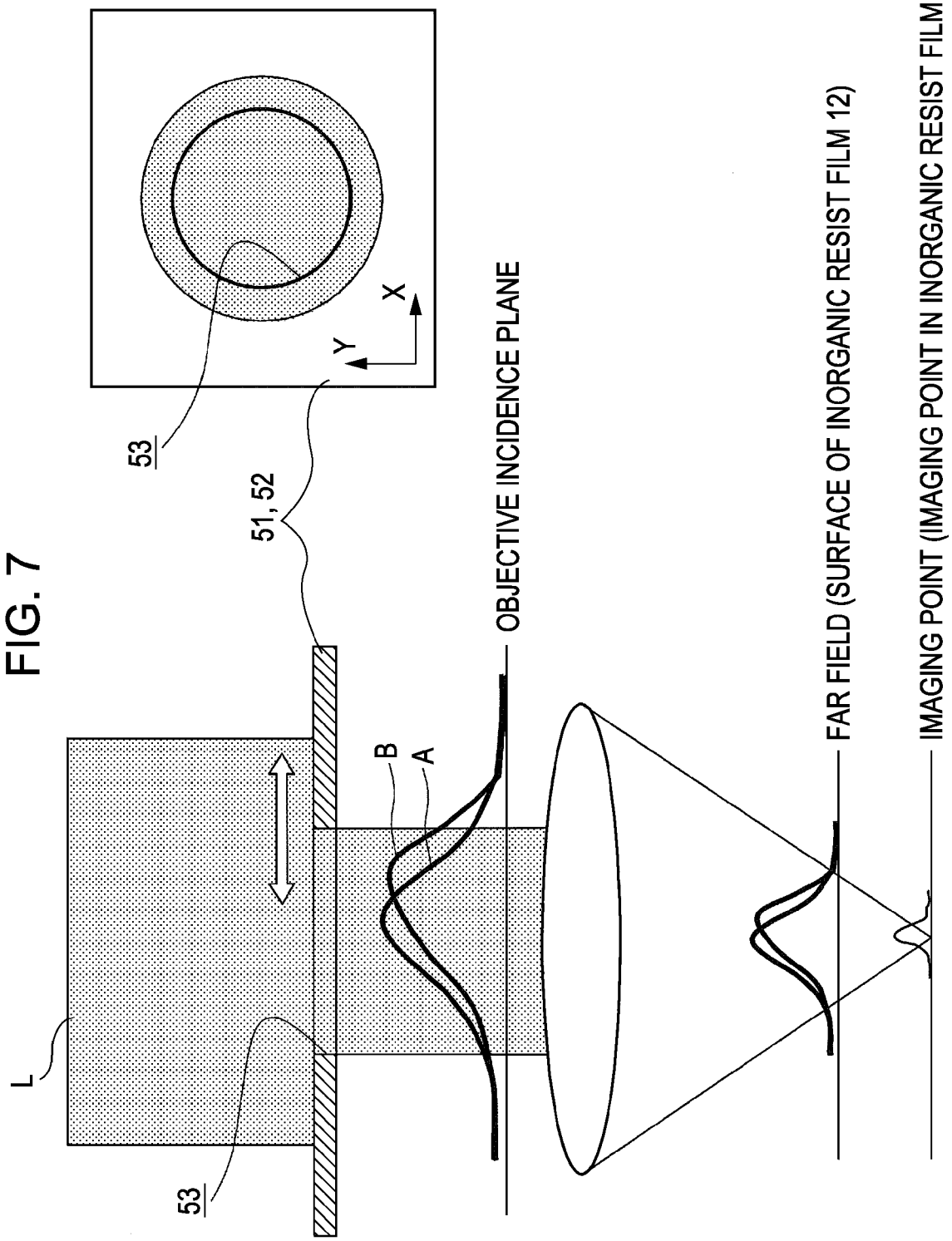

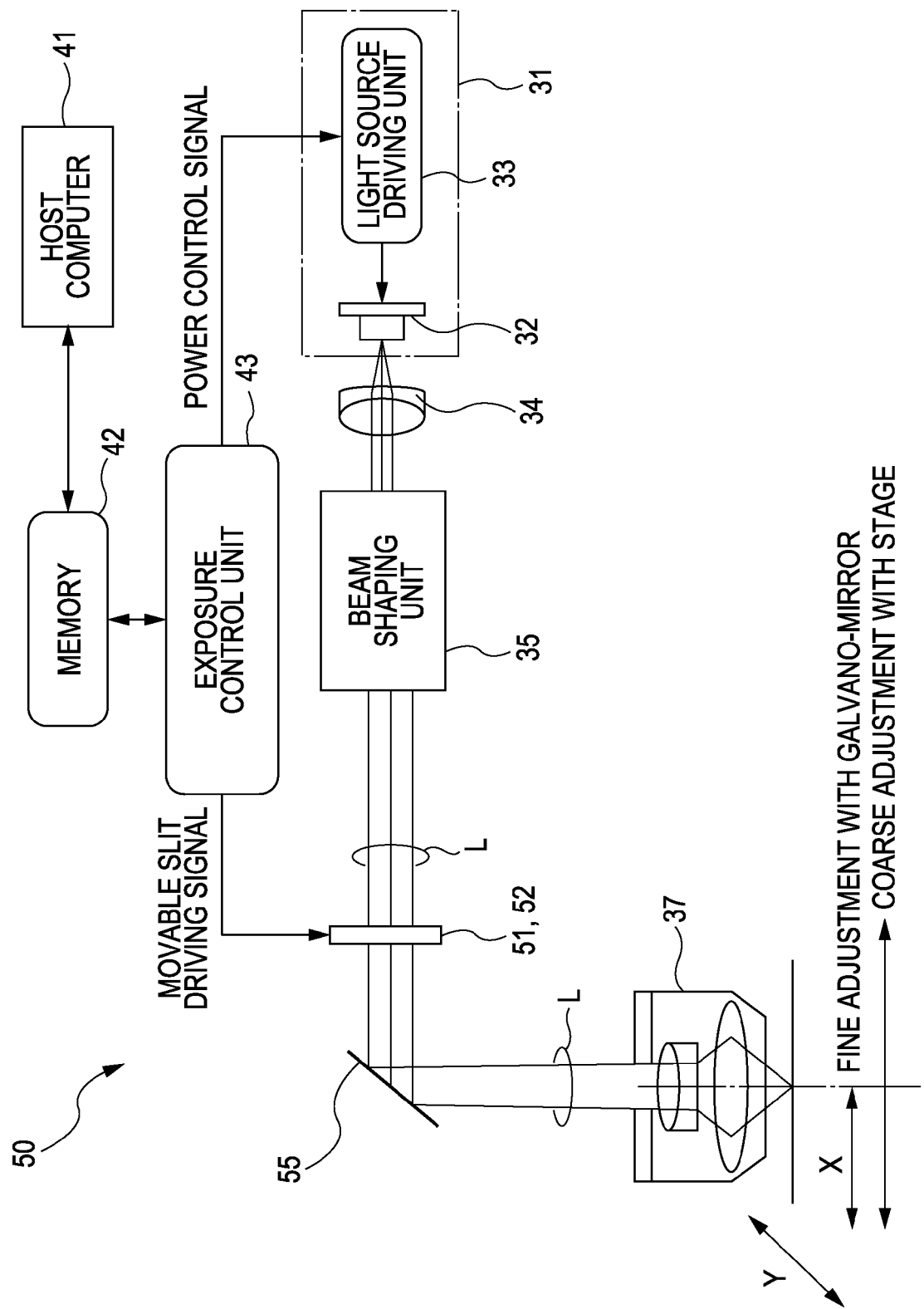

SHIFT LENS CENTER BY AMOUNT CORRESPONDING
TO SHIFT OF IMAGING POINT OF OBLIQUE INCIDENCE

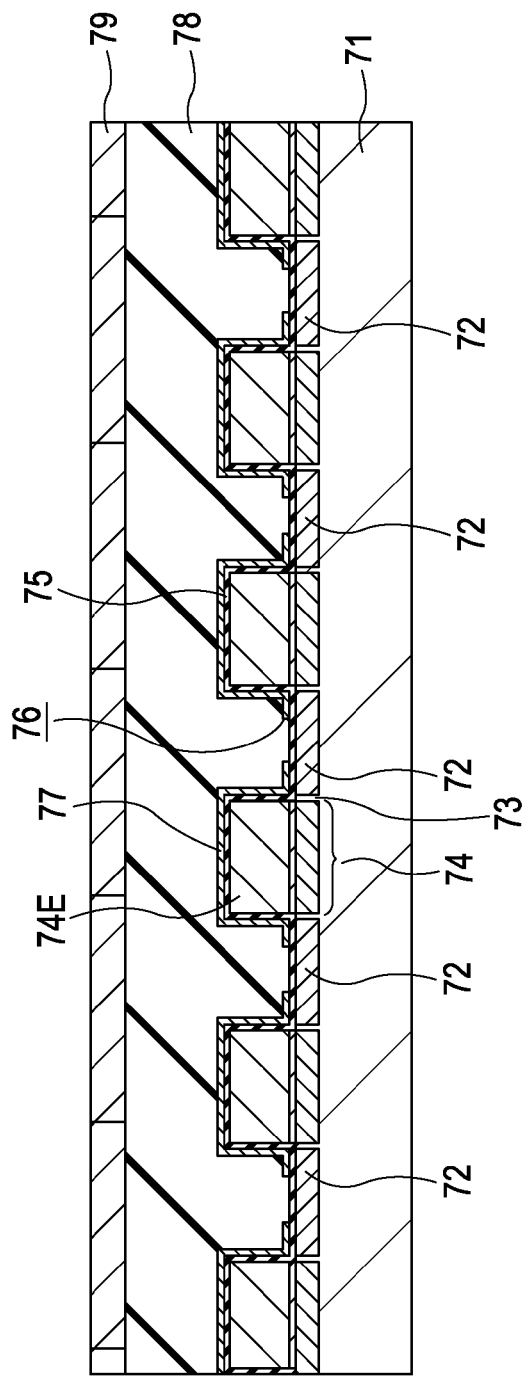
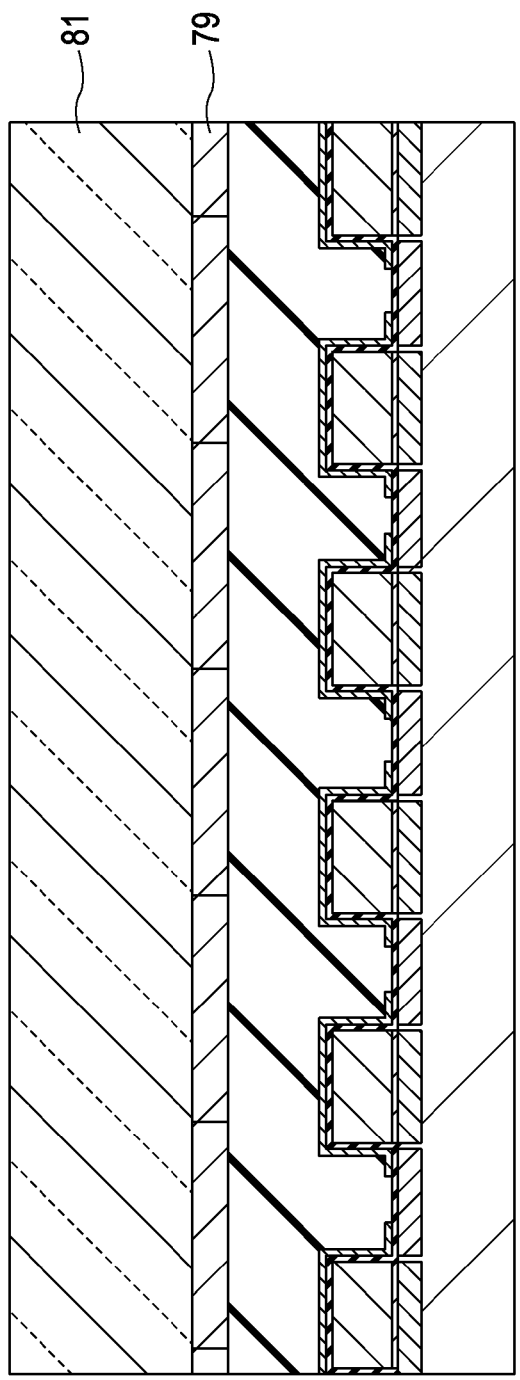
FIG. 11A
FIG. 11B

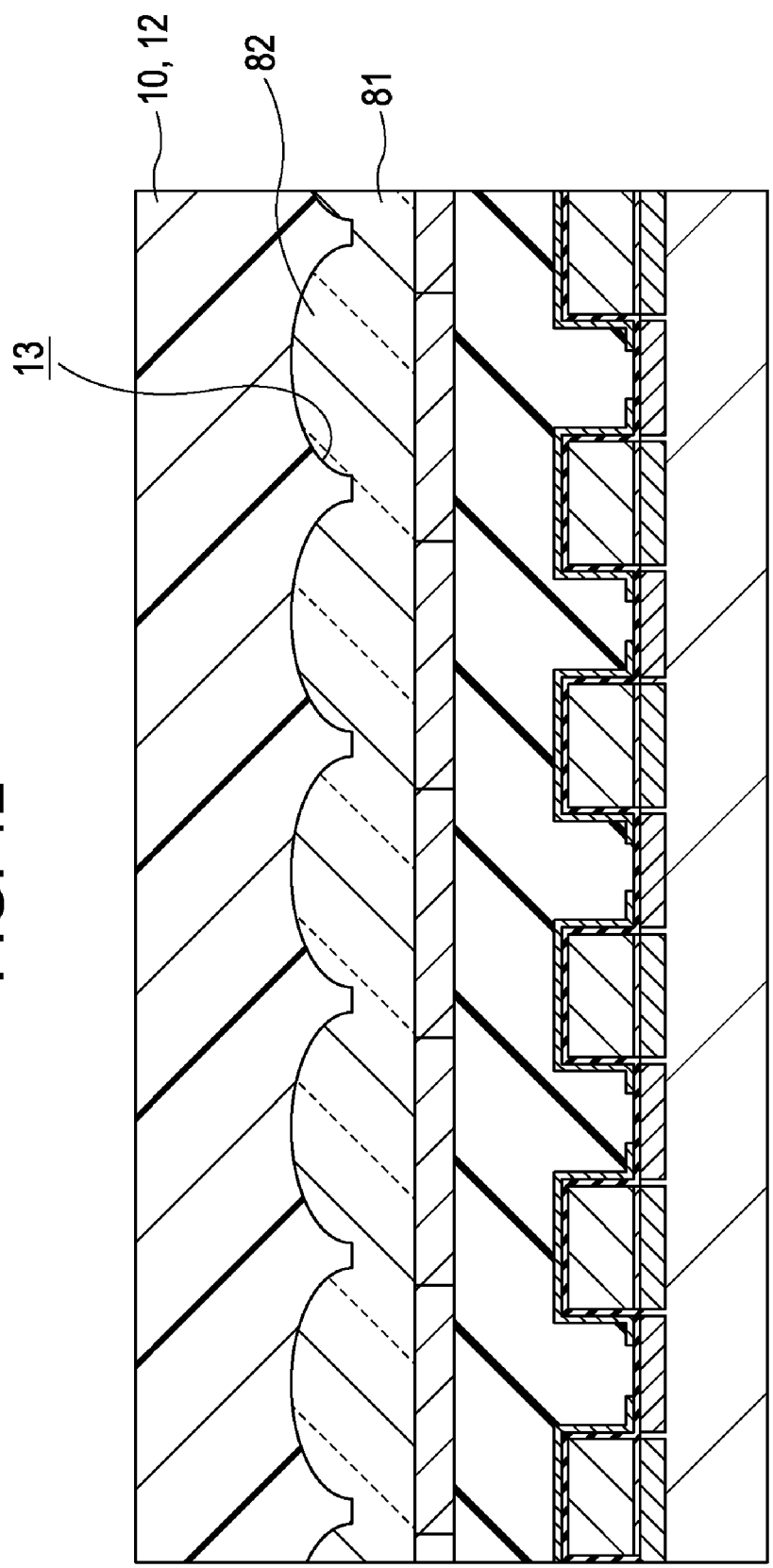

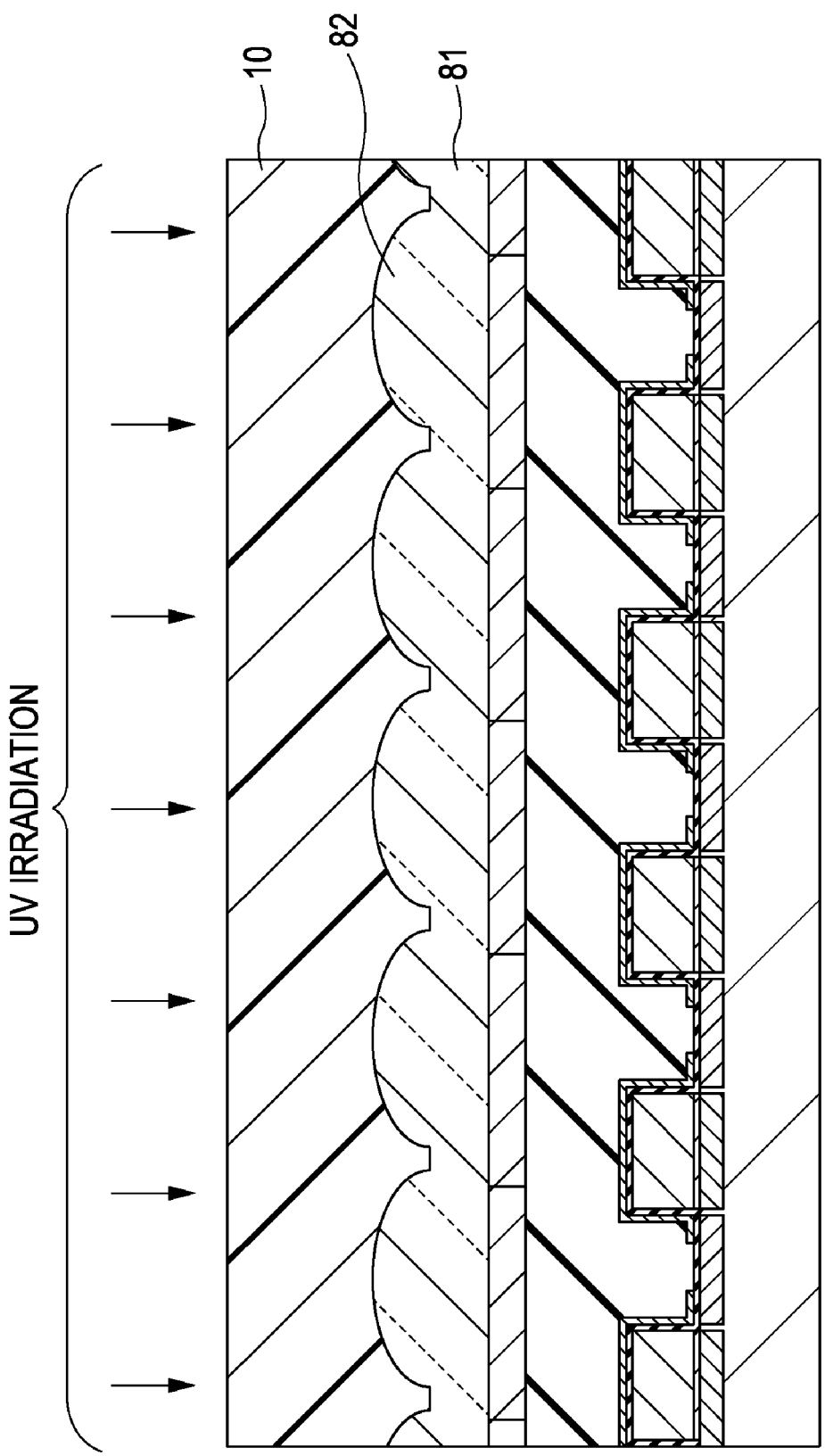

METHOD FOR MANUFACTURING MICROLENS AND METHOD FOR MANUFACTURING SOLID-STATE IMAGE SENSOR

CROSS REFERENCES TO RELATED APPLICATIONS

The present application claims priority to Japanese Patent Application JP 2008-013492 filed in the Japanese Patent Office on Jan. 24, 2008 and Japanese Patent Application JP 2008-153760 filed in the Japanese Patent Office on Jun. 12, 2008, the entire contents of which are incorporated herein by reference.

BACKGROUND

The present application relates to a method for manufacturing a microlens and a method for manufacturing a solid-state image sensor provided with the microlens.

Applications of microlenses and microlens arrays are roughly divided into microlenses for condensing light on divided microelements and microlenses alternative to single-part lenses.

In the application to microlenses for condensing light on divided microelements, for example, the microlenses are used for effectively utilizing a quantity of light by condensing incident light on effective regions of photoelectric transducers in a solid-state image sensor (CCD) of a camera including light-receiving elements, or an image sensor for reading faxes.

Also, the microlenses are used for increasing luminance by effectively condensing light in display pixels which are two-dimensionally arranged on a transflective liquid crystal display panel.

In the application to microlenses as alternatives to the single-part lenses, the microlenses are used as alternatives to lenticular lenses of a rear-type projector.

In a general method for manufacturing a microlens (including a microlens of a microlens array), a resist is melted, and a curved surface is formed using the surface tension of the melted resist.

For example, as shown in FIG. 15A, a photoresist film is formed on a lens-forming film 102 formed on a substrate 101, and exposure and development are performed for the photoresist film to form a columnar resist pattern 103.

Then, as shown in FIG. 15B, the resist pattern 103 is fluidized by heating to form the shape of a convex lens. Then, the shape is solidified by cooling to form a convex lens-shaped resist lens pattern 104.

Next, the convex lens-shaped resist lens pattern 104 and the lens-forming film 102 are etched.

As a result, as shown in FIG. 15C, the convex lens-shaped resist lens pattern 104 (refer to FIG. 15B) is transferred to the lens-forming film 102 to form a convex lens-shaped microlens 105.

Alternatively, although not shown in a drawing, a polymer film formed on a substrate is formed into a columnar shape by laser processing, and then the column-shaped polymer film is fluidized to form the shape of a convex lens using the surface tension of the polymer. Then, the polymer is solidified by cooling to form a microlens.

The above-mentioned method for manufacturing a microlens may be applied to the formation of a plurality of microlenses in a large area. However, since the convex lens-shaped resist lens pattern which determines the shape of a microlens is determined by the mobility of the resist, the degree of design freedom is decreased, and it is difficult to achieve desired light diffusion characteristics in pixels.

In addition, when the resist pattern is softened and fluidized by heating, there occurs the problem that if adjacent resist patterns come in contact with each other, the resist patterns are smoothly connected together due to the surface tension, thereby distorting the lens shape. Therefore, it is difficult to form connected microlens arrays.

In a recent compact digital camera or a camera of a cellular phone, miniaturization and thinning have proceeded, and the distance between a lens and a solid-state image sensor (e.g., a CCD or CMOS sensor) has been decreased. Therefore, there has occurred the problem that the angle of light incident on a microlens array is increased in the peripheral region of the solid-state image sensor, thereby causing large deviation from a light-receiving effective region and decreasing sensitivity due to a decrease in light-receiving efficiency.

In order to resolve the problems, a technique is disclosed, in which an optimum lens shape is formed in accordance with the position of a light-receiving portion by an electron beam exposure technique using DML (digital microlens), thereby achieving an improvement in light-receiving efficiency with an incidence angle of 30° or more (refer to, for example, Kimiaki Toshikiyo, Takanori Yogo, Motonari Ishii, Kazuhiro Yamanaka, Toshinobu Matsuno, Kazutoshi Onozawa, Takumi Yamaguchi, "A MOS Image Sensor with Microlenses Built by Sub-Wavelength Patterning", 2007 ISSCC, SESSION 28, IMAGE SENSORS 28 Aug. 2007).

Further, as a method for changing the shape of each of the lenses in the above-described microlens array, a technique of anisotropically applying pressure to a lens mold is disclosed (refer to, for example, Japanese Unexamined Patent Application Publication No. 9-323353).

The former method has the problem of using a large apparatus for electron beam exposure, and the latter method has the problem of a low degree of freedom for forming a microlens with a desired shape and the difficulty in applying to miniaturization of a microlens.

SUMMARY

A problem to be solved is that it is difficult to form a microlens with a desired shape without using an electron beam exposure device.

According to an embodiment, the formation of a microlens is provided with a desired shape without using an electron beam exposure device.

A method for manufacturing a microlens according to an embodiment includes forming a microlens by pressing a microlens mold having a reverse shape of a microlens formed therein on a microlens-forming film formed on a substrate to transfer the reverse shape of the microlens to the microlens-forming film. The microlens mold is formed by irradiating an inorganic resist film which is formed on a mold substrate with exposure light by relative two-dimensional scanning, and etching an exposed region of the inorganic resist film to form the reverse shape of the microlens. The irradiation intensity of the exposure light is adjusted to correspond to the depth of the reverse shape of the microlens from the surface of the inorganic resist film on the basis of profile data of the reverse shape of the microlens.

In the method for manufacturing the microlens, the microlens mold is formed by irradiating the inorganic resist film formed on the mold substrate with the exposure light by relative two-dimensional scanning without using electron beam exposure. In this exposure, the irradiation intensity of the exposure light is adjusted to correspond to the depth of the reverse shape of the microlens from the surface of the inorganic resist film on the basis of profile data of the reverse shape of the microlens. Consequently, when the two-dimensional plane of the inorganic resist film is irradiated with the exposure light, the exposure light is adjusted to desired irradiation intensity.

Therefore, the desired reverse shape of the microlens is obtained.

Further, the depth of the reverse shape of the microlens may be controlled by controlling etching conditions.

A method for manufacturing a microlens according to another embodiment includes of forming a microlens by pressing a microlens mold having a reverse shape of a microlens formed therein on a microlens-forming film formed on a substrate to transfer the reverse shape of the microlens to the microlens-forming film. The microlens mold is formed by irradiating an inorganic resist film which is formed on a mold substrate with exposure light, and etching an exposed region of the inorganic resist film to form the reverse shape of the microlens. In irradiation with the exposure light, the exposure light is modulated to a beam profile corresponding to the reverse shape of the microlens using a spatial modulator inserted in the optical path of the exposure light.

In the method for manufacturing the microlens, the microlens mold is formed by irradiating the inorganic resist film formed on the mold substrate with the exposure light which is modulated to the beam profile corresponding to the reverse shape of the microlens using the spatial modulator without using electron beam exposure. Consequently, the desired reverse shape of the microlens is formed in the two-dimensional plane of the inorganic film by exposure.

Further, the depth of the reverse shape of the microlens may be controlled by controlling etching conditions.

A method for manufacturing a solid-state image sensor according to a further embodiment includes forming a microlens on the incidence side of a light-receiving portion for photoelectric conversion of incident light, the microlens being adapted for condensing the incident light on the light-receiving portion. The microlens is formed by pressing a microlens mold having a reverse shape of the microlens formed therein on a microlens-forming film formed on the incidence side of the light-receiving portion to transfer the reverse shape of the microlens to the microlens-forming film. The microlens mold is formed by irradiating an inorganic resist film which is formed on a mold substrate with exposure light by relative two-dimensional scanning, and etching an exposed region of the inorganic resist film to form the reverse shape of the microlens. The irradiation intensity of the exposure light is adjusted to correspond to the depth of the reverse shape of the microlens from the surface of the inorganic resist film on the basis of profile data of the reverse shape of the microlens.

In the method for manufacturing the solid-state image sensor, the microlens is formed by the method for producing the microlens according to any one of the above-mentioned embodiments. Therefore, the microlens with a desired shape is formed without using electron beam exposure.

A method for manufacturing a solid-state image sensor according to a further embodiment includes forming a microlens on the incidence side of a light-receiving portion for photoelectric conversion of incident light, the microlens being adapted for condensing the incident light in the light-receiving portion. The microlens is formed by pressing a microlens mold having a reverse shape of the microlens formed therein on a microlens-forming film formed on the incidence side of the light-receiving portion to transfer the reverse shape of the microlens to the microlens-forming film. The microlens mold is formed by irradiating an inorganic resist film which is formed on a mold substrate with exposure light, and etching an exposed region of the inorganic resist film to form the reverse shape of the microlens. In irradiation with the exposure light, the exposure light is modulated to a beam profile corresponding to the reverse shape of the microlens using a spatial modulator inserted in the optical path of the exposure light.

In the method for manufacturing the microlens, the microlens mold is formed by the method for manufacturing the microlens according to any one of the above-mentioned embodiments. Consequently, the microlens with a desired shape is formed without using electron beam exposure.

In the method for manufacturing a microlens according to any one of the above-mentioned embodiments, the desired reverse shape of the microlens is formed in the microlens mold. Therefore, the microlens with a desired shape is formed using the microlens mold.

Therefore, the present application has the advantage that condensation characteristics of the microlens are improved.

In addition, exposure is performed using exposure light without using electron beams, thereby decreasing the cost of an exposure device and the cost of the manufacturing process.

In the method for manufacturing a solid-state image sensor according to an embodiment, the microlens is formed by the method for manufacturing the microlens according to any one of the above-described embodiments, thereby forming the microlens with a desired shape. Therefore, the present application has the advantage that condensation characteristics of the microlens are improved.

In addition, exposure is performed using exposure light without using electron beams, thereby decreasing the cost of an exposure device and the cost of the manufacturing process.

Additional features and advantages are described herein, and will be apparent from the following Detailed Description and the figures.

BRIEF DESCRIPTION OF THE FIGURES

FIGS. 1A to 1E are drawings showing steps of a method for manufacturing a microlens according to an embodiment;

FIG. 2 is a drawing showing an example of a power gradation map for exposure;

FIG. 7 is a drawing showing an example of modulation of exposure light with a spatial modulator;

FIG. 8 is a schematic drawing showing an example of a configuration of an exposure device for carrying out a method for manufacturing a microlens according to an embodiment;

FIGS. 11A and 11B are drawings showing steps of a method for manufacturing a solid-state image sensor according to an embodiment;

FIG. 12 is a drawing showing a step of a method for manufacturing a solid-state image sensor according to an embodiment;

FIG. 13 is a drawing showing a step of a method for manufacturing a solid-state image sensor according to an embodiment;

DETAILED DESCRIPTION

Figure 3:
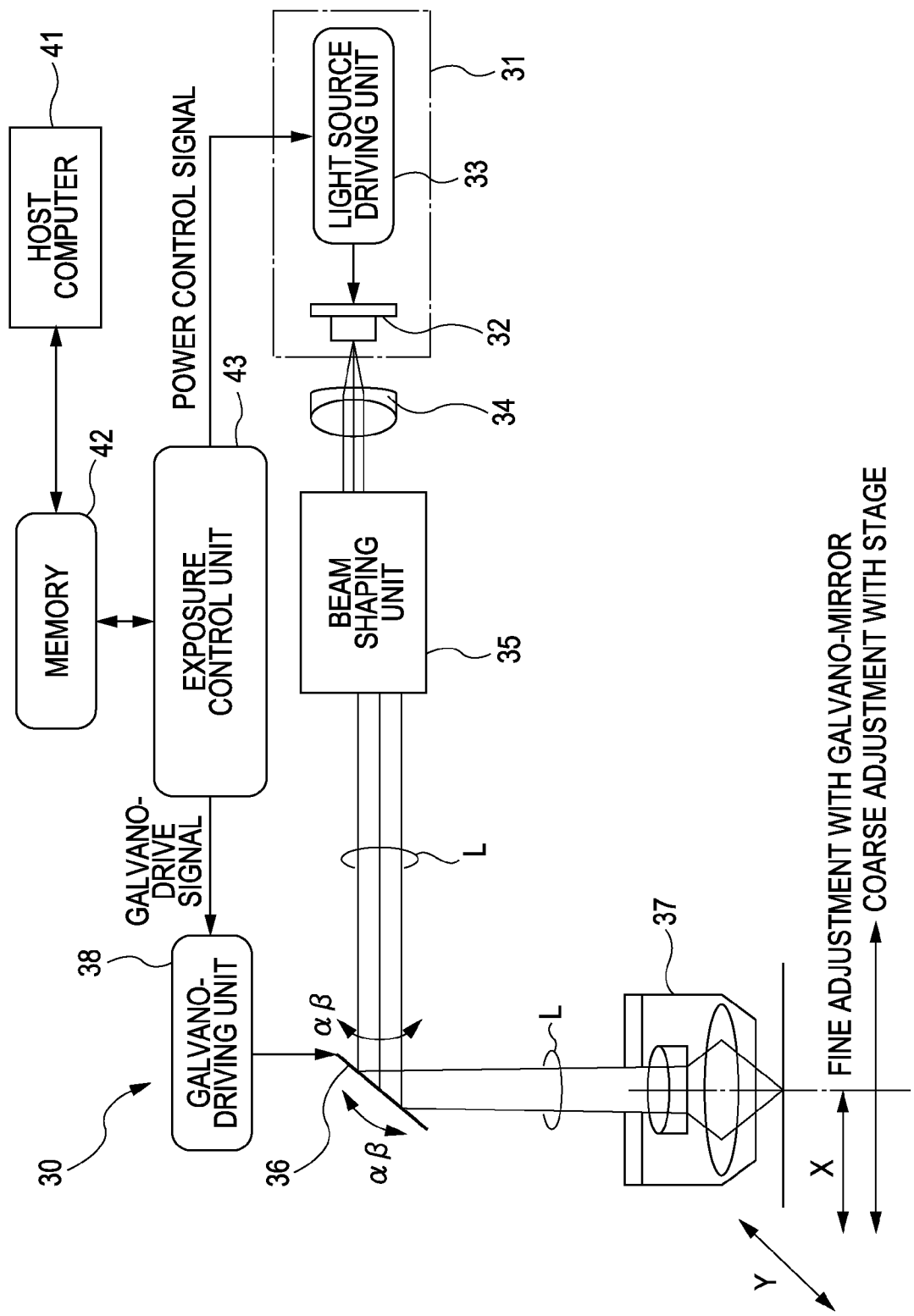
FIG. 3 is a schematic drawing showing an example of a configuration of an exposure device for carrying out a method for manufacturing a microlens according to an embodiment.

A method for manufacturing a microlens according to an embodiment is described below.

In a method for manufacturing a microlens according to an embodiment, a microlens mold in which a reverse shape of a microlens has been formed is pressed on a microlens-forming film formed on a substrate to transfer the reverse shape of the microlens to the microlens-forming film, thereby forming the microlens.

Figure 2:
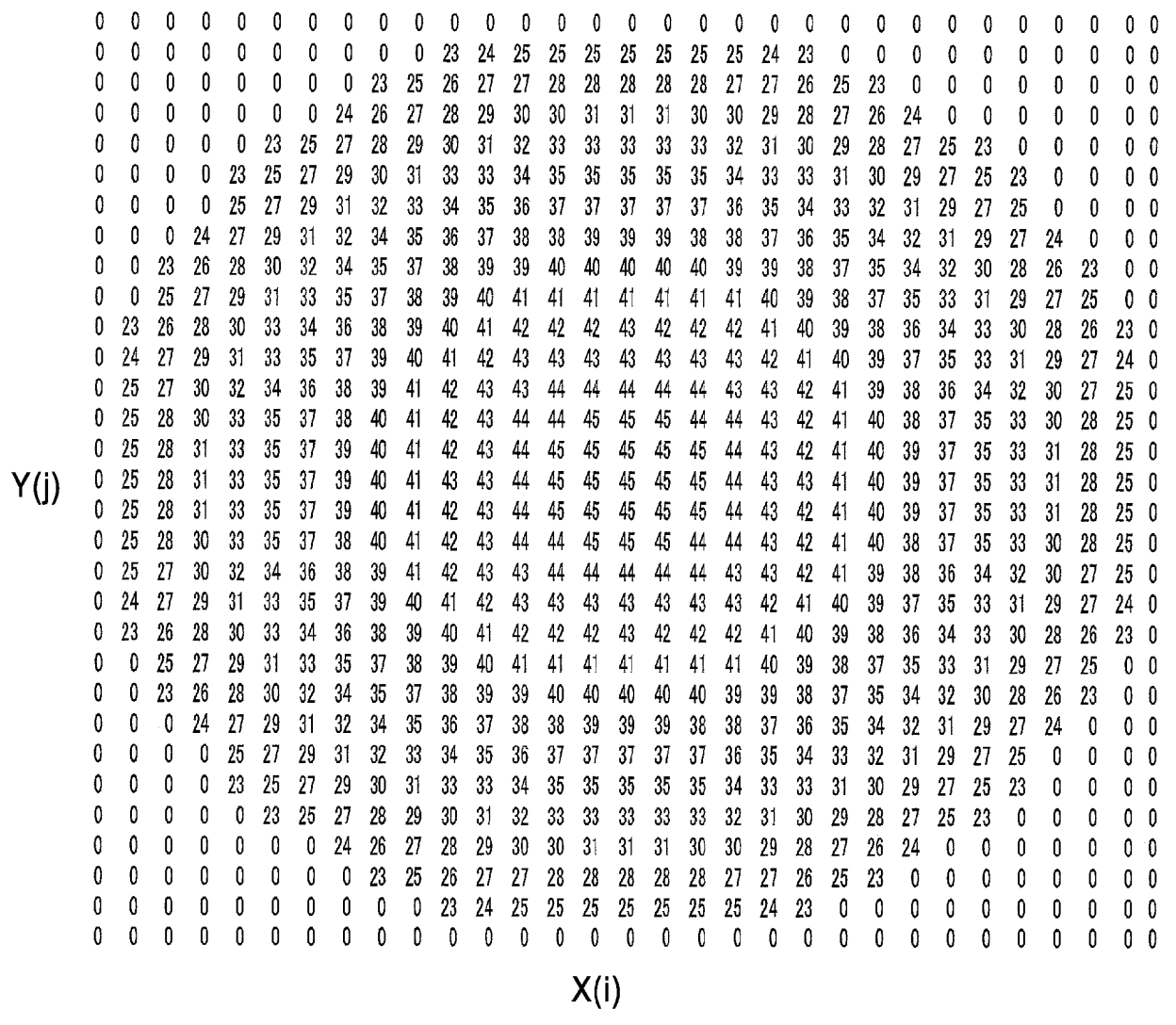

The process for forming the microlens mold is described with reference to process drawings of FIGS. 1A to 1E and FIG. 2.

As shown in FIG. 1A, an inorganic resist film 12 is formed on a mold substrate 11. As the mold substrate 11, a silicon oxide ($SiO_2$) substrate or glass substrate is used. For the inorganic resist film 12, for example, a transition metal oxide is used. For example, tungsten oxide, molybdenum oxide, an oxide of tungsten-molybdenum alloy, or the like is used. Such a material is formed on the mold substrate 11, for example, by sputtering. The inorganic resist film 12 is formed in an amorphous state.

Next, as shown in FIG. 2B, the inorganic resist film 12 formed on the mold substrate 11 is irradiated with exposure light L by relative two-dimensional scanning. For example, irradiation is performed by raster scan in which irradiation in a direction shown by an arrow in the drawing is repeated.

In FIGS. 1B to 1E, the mold substrate 11 is omitted.

The irradiation method includes scanning with the exposure light L in the X-axis direction each time when the mold substrate 11 having the inorganic resist film 12 formed thereon is moved in the Y-axis direction perpendicular to the X-axis direction.

As the exposure light L, for example, a semiconductor laser beam at a wavelength of 405 nm is used. The exposure light L is not limited to the laser beam, and the wavelength and the type of laser emission are appropriately selected according to the type of the inorganic resist 12. For example, a higher harmonic wave of a solid-state laser may be used.

In the scanning method, for example, when the Y-axis and the X-axis coincide with the column direction and the row direction, respectively, the substrate 11 is fixed at the first column, and the inorganic resist film 12 is irradiated with the exposure light L by scanning in the X-axis direction.

Next, the mold substrate 11 is moved by one step in the Y-axis direction and fixed at the second column. Then, the inorganic resist film 12 is irradiated with the exposure light L by scanning in the X-axis direction.

In this way, the substrate 11 is moved by step and fixed, and the inorganic resist film 12 is irradiated with the exposure light L by scanning in the X-axis direction. This operation is repeated, for example, m times. Here, m represents the number of steps appropriately set in the Y-axis direction according to the size of the microlens.

In addition, during scanning with the exposure light L, the irradiation intensity of the exposure light L is adjusted to correspond to the depth of a reverse shape of the microlens from the surface of the inorganic resist film 12 with reference to profile data of the reverse shape of the microlens. For example, the irradiation intensity is adjusted to match with the division number in the X-axis direction.

For example, when the division number in the X-axis direction is n, n corresponds to the number of profile data items in the X-axis direction for a column in the Y-axis direction in the reverse shape of the microlens.

For example, in one time of scanning with the exposure light L, when the number of profile data items is i, the intensity of the exposure light is adjusted n=i times.

For example, in a profile data map of the reverse shape of the microlens, n=i=31 in the X-axis direction, and j=31 steps in the Y-axis direction.

A power gradation map of exposure is formed to correspond to the profile data map.

For example, a power gradation map of exposure as shown in FIG. 2 is formed.

Furthermore, in both the X-axis direction and the Y-axis direction, irradiation with the exposure light L is not performed for a column and row with power data "0". In the irradiation with the exposure light L, for example, the irradiation intensity is increased as the value of exposure power gradation increases.

In this way, the power gradation of the exposure light L is changed to correspond to the depth of the reverse shape of the microlens from the surface of the inorganic resist film 12 with referent to the profile data of the reverse shape of the microlens. Namely, the irradiation intensity is adjusted.

As described above, the inorganic resist film 12 is exposed to light by raster scanning.

As a result, as shown in FIG. 1C, in the inorganic resist film 12, crystallization proceeds in a portion irradiated with the exposure light L by thermochemical reaction due to laser beam irradiation, and the portion is swollen to form a micro gap in the film.

In this state, the inorganic resist film 12 is etched.

As a result, as shown in FIG. 1D, the reverse shape 13 of the microlens is formed in the inorganic resist film 12.

Further, in the exposure, the reverse shape of the microlens may be controlled by selecting the material of the inorganic resist film 12.

For example, when the inorganic resist film 12 is composed of tungsten oxide, the reverse shape of the microlens is formed in a shape in which the side wall rises, and etching may be performed to attain an aspect ratio. For example, exposure may be performed to a depth of about 100 nm from the surface of the inorganic resist film 12, for obtaining the reverse shape of the microlens.

When the inorganic resist film 12 is composed of molybdenum oxide, the reverse shape of the microlens is formed in a shape in which the side wall is gently inclined.

Further, when the inorganic resist film 12 is composed of tungsten-molybdenum alloy oxide, the inclination of the side wall of the reverse shape of the microlens may be adjusted by controlling the mixing ratio.

The process using the inorganic resist film 12 utilizes a phase transition mastering (PTM) technique and is suitable for forming a microlens because the half-tone depth of the inorganic resist film 12 may be controlled by light irradiation.

In the above-described process, the reverse shape 13 of the microlens is formed in the inorganic resist film 12. When the process is repeated at desired lens formation positions, as shown in FIG. 1E, reverse shapes of a plurality of microlenses are formed in the inorganic resist film 12. Consequently, the microlens mold 10 for forming a microlens array is formed.

The microlens mold 10 has the advantage that the reverse shape 13 of each microlens is formed to match with the shape of each microlens by controlling the quantity of exposure in raster scanning.

Although not shown in the drawings, the inorganic resist film 12 in which the reverse shape 13 of the microlens of the microlens mold 10 has been formed is pressed on a lens-forming film formed on a substrate and used for forming the microlens. As a result, the reverse shape 13 of the microlens is transferred to the lens-forming film to form the microlens in the lens-forming film.

Therefore, a plurality of microlenses may be formed by one time of embossing.

Next, an exposure device for the exposure is described with reference to a schematic drawing of FIG. 3.

As shown in FIG. 3, an exposure device 30 is provided with a light source 31 for emitting the exposure light L. The light source 31 includes, for example, a semiconductor laser emitter 32 for emitting the exposure light L, and a light source driving unit 33 for driving the semiconductor laser emitter 32. The light source 31 is not limited to the semiconductor laser emitter, and any light source may be used as long as the exposure light is emitted. For example, a solid-state laser emitter may be used.

The exposure light L emitted from the light source 31 is passed through an optical system in which a collimeter lens 34, a beam shaping unit 35, a galvano mirror 36, and a condensing optical unit 37 are arranged in that order and is applied to an object to be irradiated (e.g., the inorganic resist film 12).

The beam shaping unit 35 includes, for example, a beam shaping prism.

The angle of the galvano mirror 36 is changed by, for example, a galvano driving unit 38. Therefore, the irradiation plane is scan with the exposure light L.

Further, a stage (not shown) is provided on the irradiation plane with the exposure light L in order to fix the object to be irradiated (e.g., the inorganic resist film formed on the substrate) The stage is moved in the X-axis direction and the Y-axis direction.

Further, a host computer 41 is provided for previously digitizing the power gradation data of the exposure light L applied at each coordinate by raster scanning. Further, a memory 42 is provided for storing the data. In other words, the memory 42 stores each coordinate position in raster scanning and digitized information of the power gradation data of the exposure light corresponding to each coordinate position.

In addition, an exposure control unit 43 converts the coordinate position of raster scanning, which is stored in the memory 42, to a galvano driving signal and commands the galvano driving unit 38 to drive the galvano mirror 36 on the basis of the command.

At the same time, the exposure control unit 43 fetches the digitized power gradation data corresponding to the coordinate positions of raster scanning, converts the data into power control signals, and commands the light source driving unit 33. In the light source driving unit 33, the intensity of the exposure light L is obtained according to the power control signals so that the exposure light L is emitted from the light source 31.

Next, exposure by raster scanning with the exposure device 30 is described.

Figure 4A:
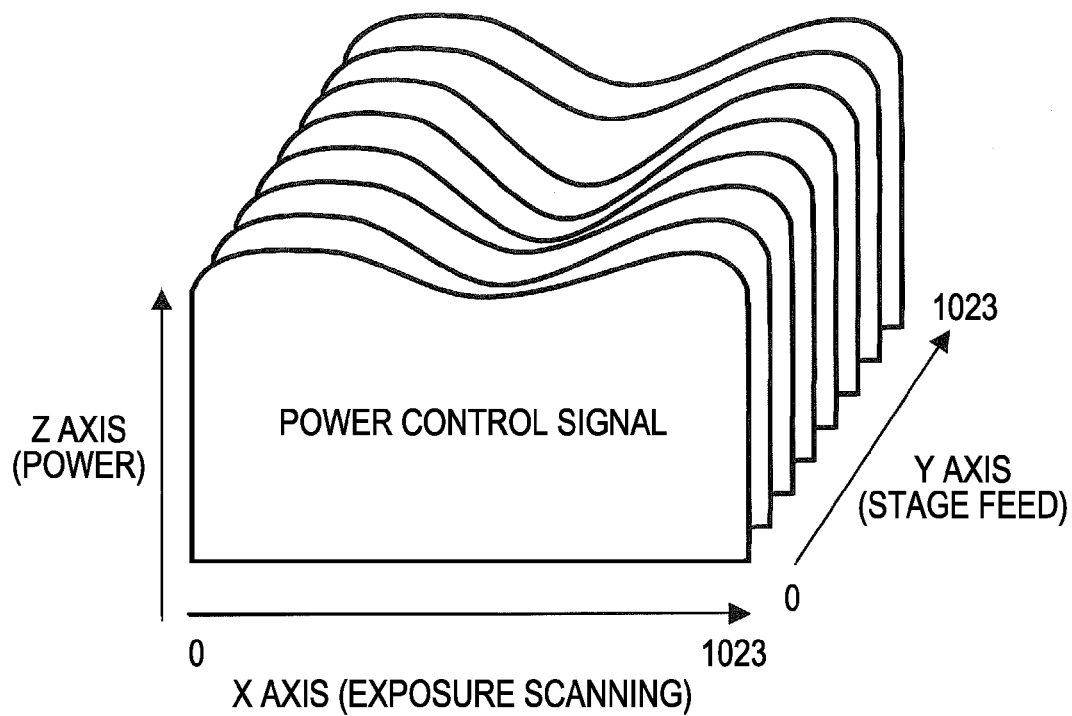
FIGS. 4A and 4B are diagrams illustrating an example of exposure by raster scanning.

The coordinate positions for obtaining the reverse shape of the microlens are divided into, for example, 1024 steps in the X-axis direction and 1024 steps in the Y-axis direction. As shown in FIG. 4A, the power control signals are determined by the exposure control unit so as to correspond to the division number, i.e., correspond to address "0" to address "1023" in the X-axis direction and address "0" to address "1023" in the Y-axis direction. FIG. 4A shows a case in which the exposure light L is scan in the X-axis direction, and the stage is scan in the Y-axis direction. In FIG. 4A, the power of the light source driving unit for emitting laser light is shown on the Z axis.

Figure 4B:
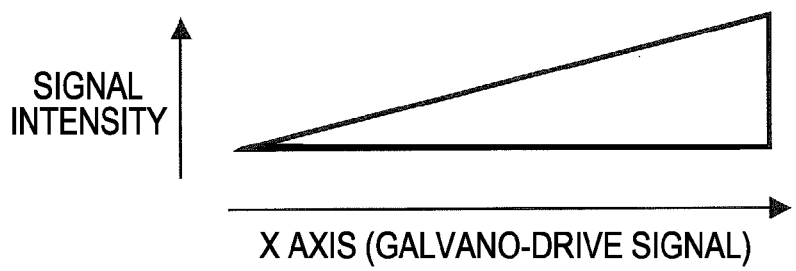

FIG. 4B shows an example of a galvano driving signal in scanning with the exposure light L in the X-axis direction at a predetermined address in the Y-axis direction.

Figure 5A:
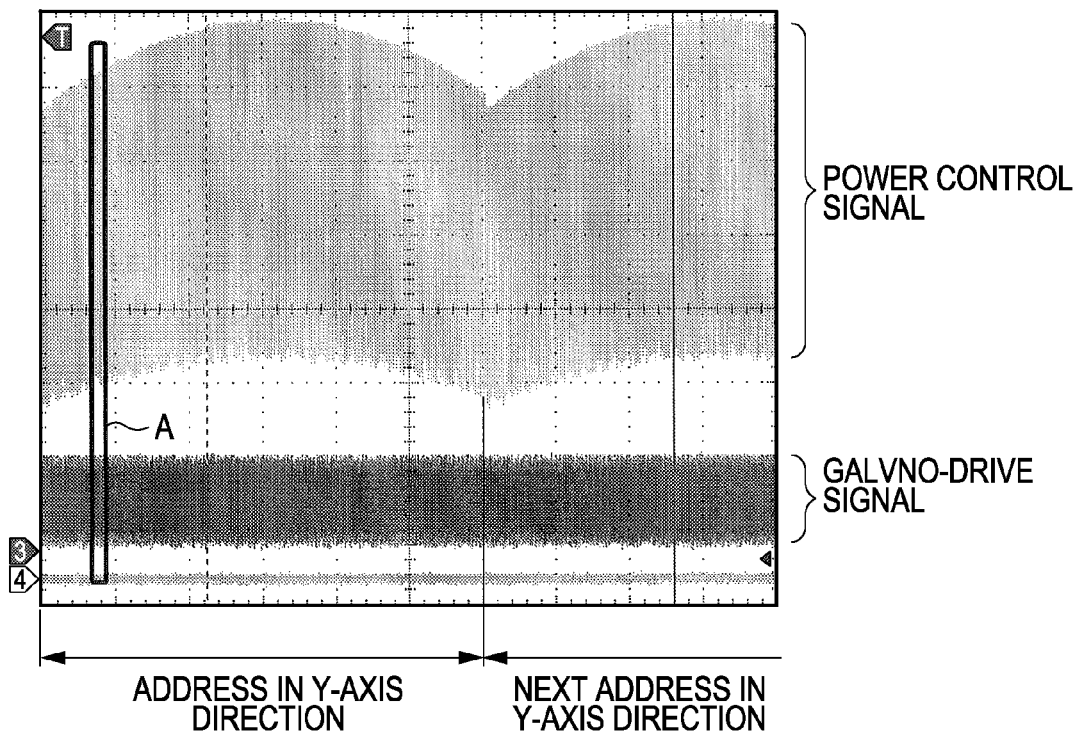
FIGS. 5A and 5B are diagrams illustrating examples of a galvano-drive signal and a power control signal.
Figure 5B:
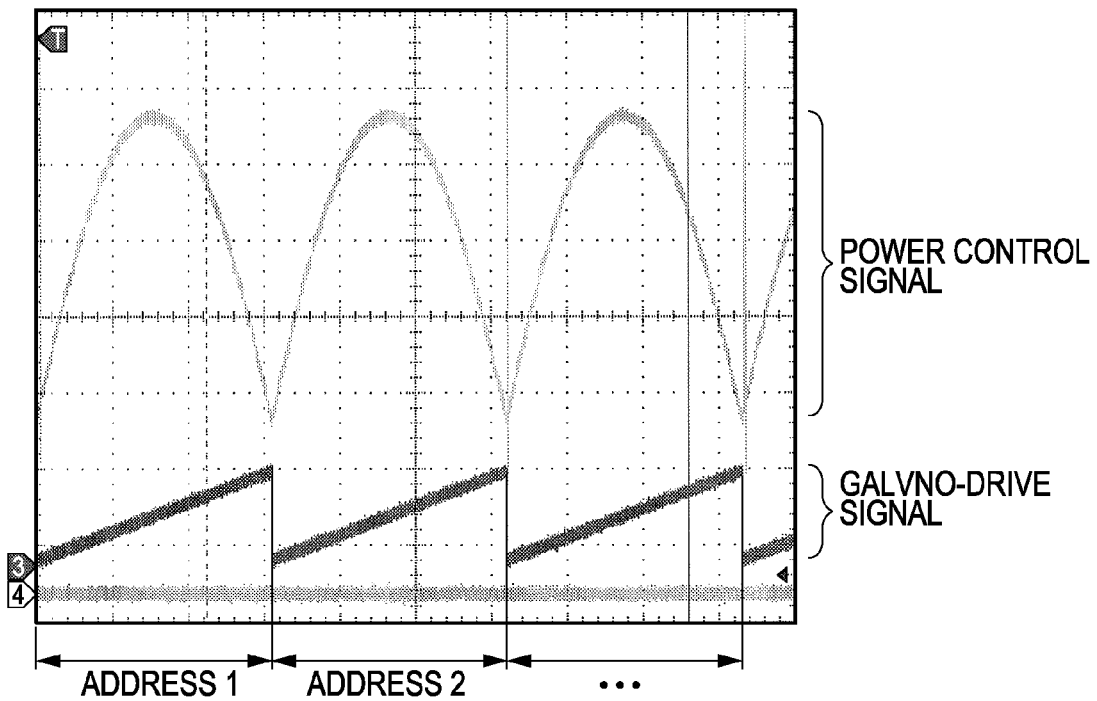

Therefore, as shown in FIG. 5B which is an enlarged view of portion A in FIG. 5A, the galvano mirror is driven by the galvano driving signal for each address in the X-axis direction, and at the same time, the data is converted to the power control signal corresponding to each address. This operation is performed for address "0" to address "1023" in the X-axis direction to complete exposure corresponding to an address in the Y-axis direction. This exposure is preformed for address "0" to address "1023" in the Y-axis direction to expose the portion of the reverse shape of one microlens.

In the above-described method for manufacturing the microlens according to the embodiment, when the microlens mold 10 is formed, light exposure is used without using electron beam exposure, and the inorganic resist film 12 formed on the mold substrate 11 is irradiated with the exposure light L by relative two-dimensional scanning on the inorganic resist film 12. In this exposure, the irradiation intensity of the exposure light L is adjusted to correspond to the depth of the reverse shape of the microlens from the surface of the inorganic resist film 12 on the basis of the profile data of the reverse shape of the microlens. As a result, the inorganic resist film 12 is irradiated with the exposure light L adjusted to desired irradiation intensity in a two-dimensional plane.

Therefore, the desired reverse shape 13 of the microlens is formed in the microlens mold 10.

During etching, the depth of the reverse shape 13 of the microlens may be controlled by controlling the etching conditions.

Therefore, the microlens formed using the microlens mold 10 has a shape close to or equal to a design shape, and there is thus the advantage that the condensation characteristics of the microlens are improved.

Further, light exposure is used without using electron beams, thereby decreasing the cost of the exposure device and the cost of the manufacturing process. Since the intensity of the exposure light L is directly controlled, a mask may not be used, thereby simplifying the manufacturing process.

Next, a method for manufacturing a microlens according to another embodiment is described.

In the method for manufacturing a microlens, a microlens mold having a reverse shape of a microlens formed therein is pressed on a microlens-forming film formed on a substrate, and the reverse shape of the microlens is transferred to the microlens-forming film to form the microlens.

A process for forming the microlens mold is described with reference to process drawings of FIGS. 6A to 6E and FIG. 7.

Figure 6A:
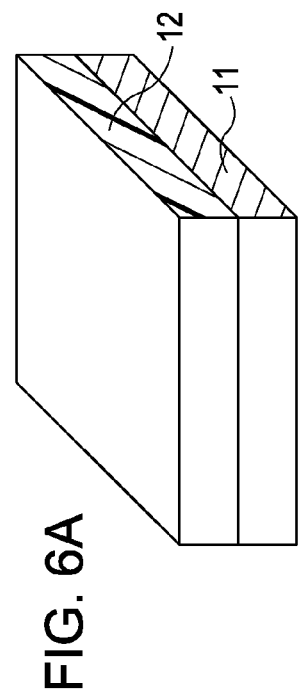
FIGS. 6A to 6E are drawings showing steps of a method for manufacturing a microlens according to another embodiment.

As shown in FIG. 6A, an inorganic resist film 12 is formed on a mold substrate 11. As the mold substrate, a silicon oxide ($SiO_2$) substrate or a glass substrate is used. For the inorganic resist film 12, for example, a transition metal oxide is used. For example, tungsten oxide, molybdenum oxide, or tungsten-molybdenum alloy oxide, or the like is used. Such a material is formed on the mold substrate 11 by sputtering. The inorganic resist film 12 is formed in an amorphous state.

Figure 6B:
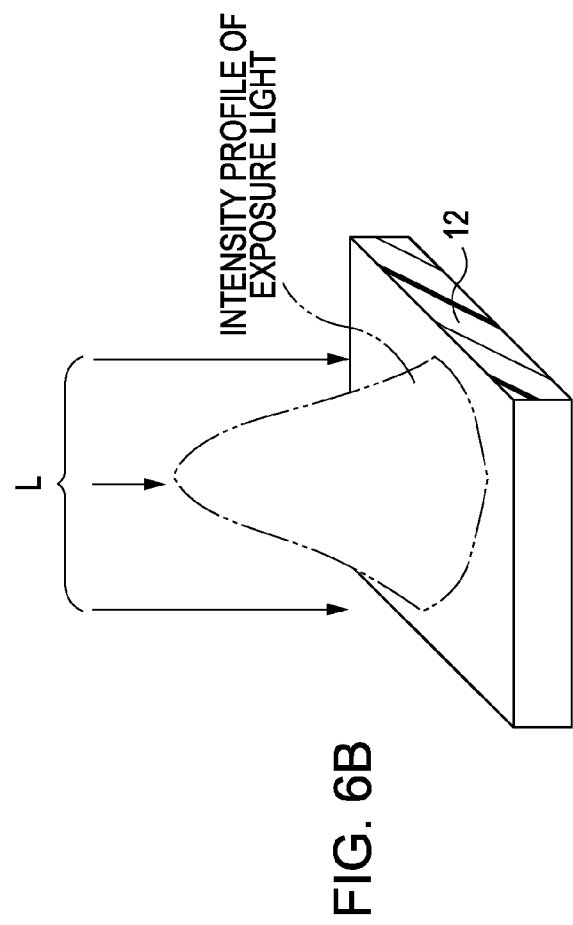

Then, as shown in FIG. 6B, the inorganic resist film 12 formed on the mold substrate 11 is irradiated with the exposure light L which is modulated to a beam profile corresponding to the reverse shape of the microlens.

As the exposure light L, for example, a semiconductor laser beam at a wavelength of 405 nm is used. The exposure light L is not limited to the laser beam, and the wavelength and type of laser emission are appropriately selected according to the type of the inorganic resist film 12. For example, a higher harmonic of a solid-state laser may be used.

In FIGS. 6B to 6E, the mold substrate 11 is omitted.

In the irradiation method, as shown in FIG. 7, the exposure light L is modulated to the beam profile corresponding to the reverse shape of the microlens by a spatial modulator 51. As the spatial modulator 51, for example, a movable slit 52 may be used. In addition, the reduced scales of a plan view and a sectional view of FIG. 7 are different, and a plan view is reduced.

For example, an aperture 53 of the movable slit 52 is moved in two-dimensional directions, i.e., the X-axis direction and the Y-axis direction, with respect to a center of the exposure light L within the range of the optical diameter of the exposure light L. Alternatively, the aperture 53 is eccentrically moved in a circle or ellipse with respect to the center of the exposure light L.

As a result, the exposure light L is modulated to the beam profile corresponding to the desired reverse shape of the microlens.

For example, when the center of the exposure light L positions at the center of the aperture 53 of the movable slit 52, an intensity distribution of the exposure light is, for example, intensity distribution A. When the movable slit 52 is moved in an arrow direction (for example, to the right on the X axis in FIG. 7), an intensity distribution of the exposure light is, for example, intensity distribution B.

As described above, the exposure light L is modulated to the beam profile (intensity distribution) corresponding to the reverse shape of the microlens shown in FIG. 6B by the spatial modulator 51 and applied to the inorganic resist film 12.

Figure 6C:
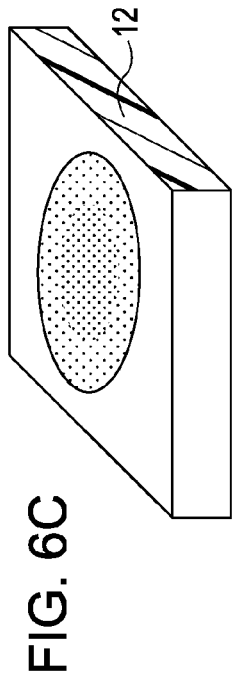

As a result, as shown in FIG. 6C, in the inorganic resist film 12, crystallization proceeds in a portion irradiated with the exposure light L by thermochemical reaction due to laser beam irradiation, and the portion is swollen to form a micro gap in the film.

In this state, the inorganic resist film 12 is etched.

Figure 6D:
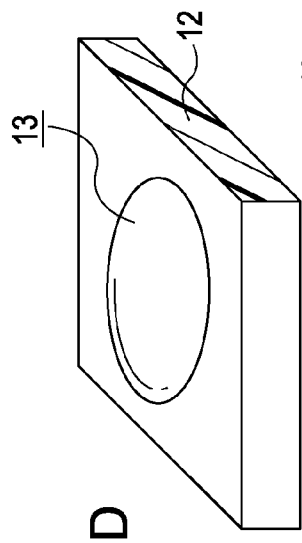

As a result, as shown in FIG. 6D, the reverse shape 13 of the microlens is formed in the inorganic resist film 12.

Further, in the exposure, the reverse shape of the microlens may be controlled by selecting the material of the inorganic resist film 12.

For example, when the inorganic resist film 12 is composed of tungsten oxide, the reverse shape of the microlens is formed in a state in which the side wall rises, and etching may be performed to attain an aspect ratio. For example, exposure may be performed to a depth of about 100 nm from the surface of the inorganic resist film 12, for obtaining the reverse shape of the microlens.

When the inorganic resist film 12 is composed of molybdenum oxide, the reverse shape of the microlens is formed in a state in which the side wall is gently inclined.

Further, when the inorganic resist film 12 is composed of tungsten-molybdenum alloy oxide, the inclination of the side wall of the reverse shape of the microlens may be adjusted by controlling the mixing ratio.

The process using the inorganic resist film 12 utilizes a phase transition mastering (PTM) technique and is suitable for forming a microlens because the half-tone depth of the inorganic resist film 12 may be controlled by light irradiation.

Figure 6E:
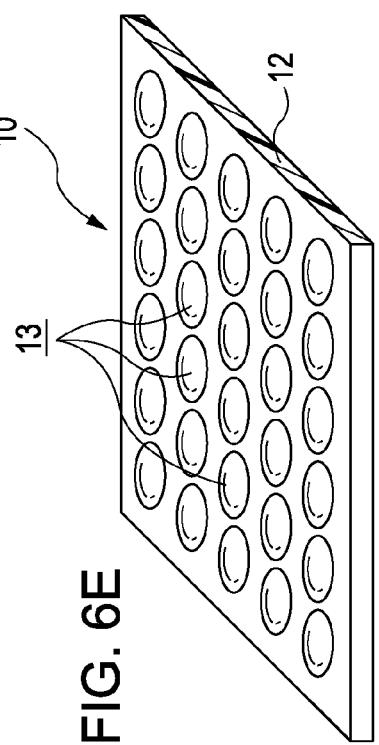

In the above-described process, the reverse shape 13 of the microlens is formed in the inorganic resist film 12. When the process is repeated at desired lens formation positions, as shown in FIG. 6E, reverse shapes 13 of a plurality of microlenses are formed in the inorganic resist film 12. Consequently, the microlens mold 10 for forming a microlens array is formed.

The microlens mold 10 has the advantage that the reverse shape 13 of each microlens is formed to match with the shape of each microlens by controlling the quantity of exposure in raster scanning.

Although not shown in the drawings, the inorganic resist film 12 in which the reverse shape 13 of the microlens of the microlens mold 10 has been formed is pressed on a lens-forming film formed on a substrate and used for forming the microlens. As a result, the reverse shape 13 of the microlens is transferred to the lens-forming film to form the microlens in the lens-forming film.

Therefore, a plurality of microlenses may be formed by one time of embossing.

Next, an exposure device for the exposure is described with reference to a schematic drawing of FIG. 8.

As shown in FIG. 8, an exposure device 50 is provided with a light source 31 for emitting the exposure light L. The light source 31 includes, for example, a semiconductor laser emitter 32 for emitting the exposure light L, and a light source driving unit 33 for driving the semiconductor laser emitter 32. The light source 31 is not limited to the semiconductor laser emitter, and any light source may be used as long as the exposure light is emitted. For example, a solid-state laser emitter may be used.

The exposure light L emitted from the light source 31 is passed through an optical system in which a collimeter lens 34, a beam shaping unit 35, a spatial modulator 51 (e.g., the movable slit 52), a mirror 55, and a condensing optical unit 37 are arranged in that order and is applied to an object to be irradiated (e.g., the inorganic resist film 12).

The beam shaping unit 35 includes, for example, a beam shaping prism.

As described with reference to FIG. 7, the movable slit 52 is moved to modulate the exposure light L to the beam profile (intensity distribution) corresponding to the reverse shape of the microlens.

As the mirror 55, a general reflecting mirror is used. Alternatively, the mirror 55 may be, for example, a galvano mirror so as to permit fine adjustment of the irradiation position of the exposure light L. In this case, a galvano mirror driving portion (not shown) is provided.

Further, a stage (not shown) is provided on the irradiation plane with the exposure light L, for fixing the object to be irradiated (e.g., the inorganic resist film formed on the substrate). The stage is moved in the X-axis direction and the Y-axis direction.

Further, a host computer 41 is provided for previously digitizing the power modulation data of the exposure light L, and a memory 42 is provided for storing the data. In other words, the memory 42 stores each coordinate position and digitized information of the power modulation data of the exposure light corresponding to each coordinate position.

In addition, the exposure control unit 43 converts each coordinate position stored in the memory 42 to a spatial modulation signal (for example, a movable slit driving signal) and commands the spatial modulator 51 (e.g., the movable slit 52) to drive the spatial modulator 51 (e.g., the movable slit 52) on the basis of the command.

At the same time, the exposure control unit 43 takes out the power modulation data corresponding to each coordinate position and converts the data to a power control signal to command the light source driving unit 33. In the light source driving unit 33, the exposure light L is emitted from the light source 31 so as to obtain the intensity of the exposure light L in accordance with the power control signal.

Figure 9:
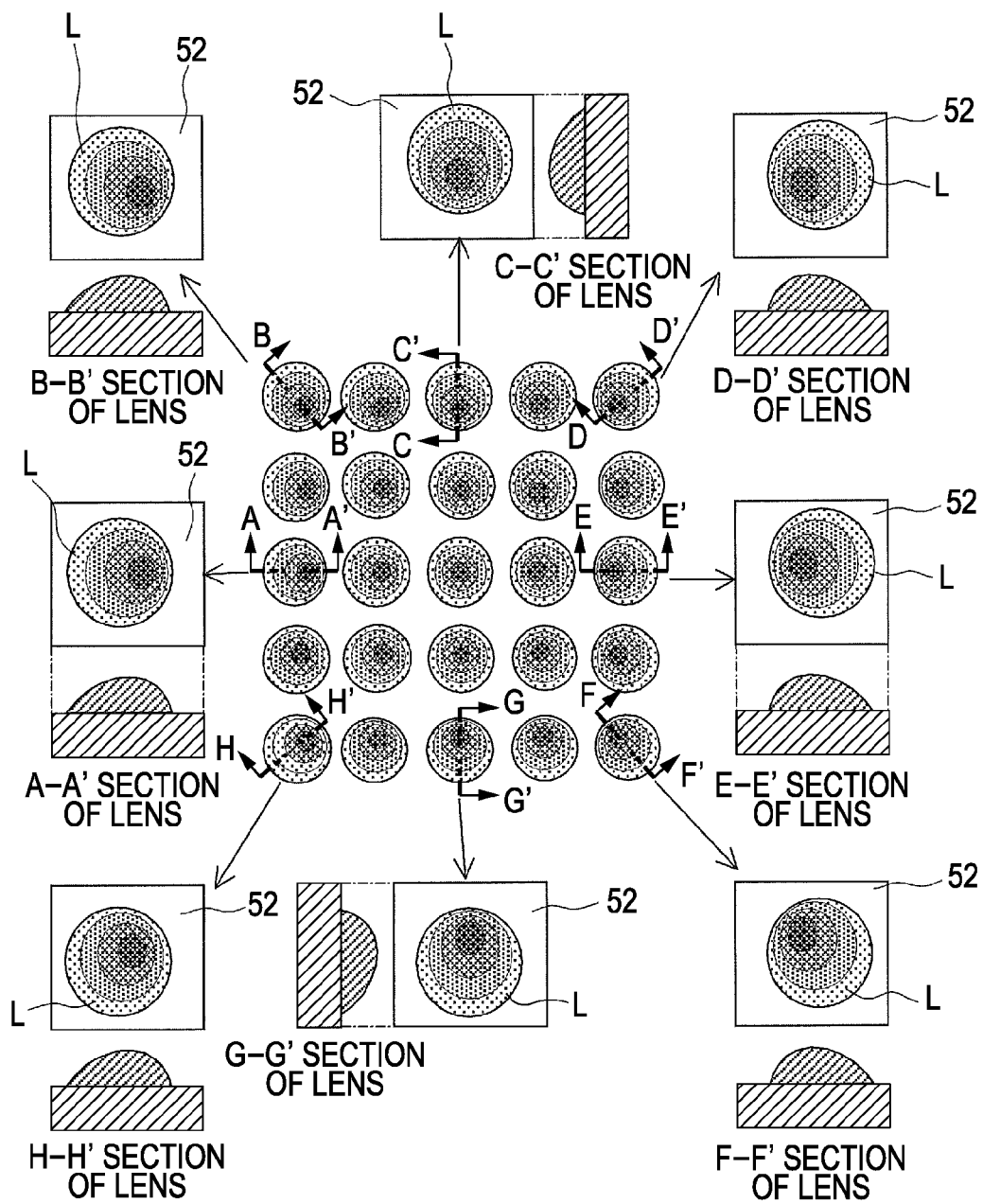
FIG. 9 is a drawing showing an example of exposure light for forming the reverse shapes of a plurality of microlenses which constitute a microlens array.

FIG. 9 shows an example of exposure light for obtaining reverse shapes of a plurality of microlenses which form a microlens array and sectional views of lens shapes obtained by the exposure light at respective positions. The sectional views at the respective positions include, for example, an A-A' section, a B-B' section, a C-C' section, a D-D' section, a E-E' section, a F-F' section, a G-G' section, and a H-H' section. FIG. 10 is an enlarged view of a lens portion.

In the manufacturing method, as shown in FIG. 9, beam irradiation is performed with an appropriate profile for the reverse shape of each microlens by moving the exposure light by step in the X-axis direction and the Y-axis direction using the exposure device 50.

FIG. 9 shows a plurality of circular distribution diagrams at the center and 9 enlarged views around the diagrams, each of the enlarged views showing an intensity distribution of exposure light by contour lines. Each of the views shows an orange peel-like pattern in which the exposure light with high intensity is shown by a dark portion, and the exposure light L with low intensity is shown by a light portion. Such gradation may be achieved by, for example, appropriately moving the movable slit 52 in the X-axis direction and the Y-axis direction for the exposure light L.

Figure 10A:
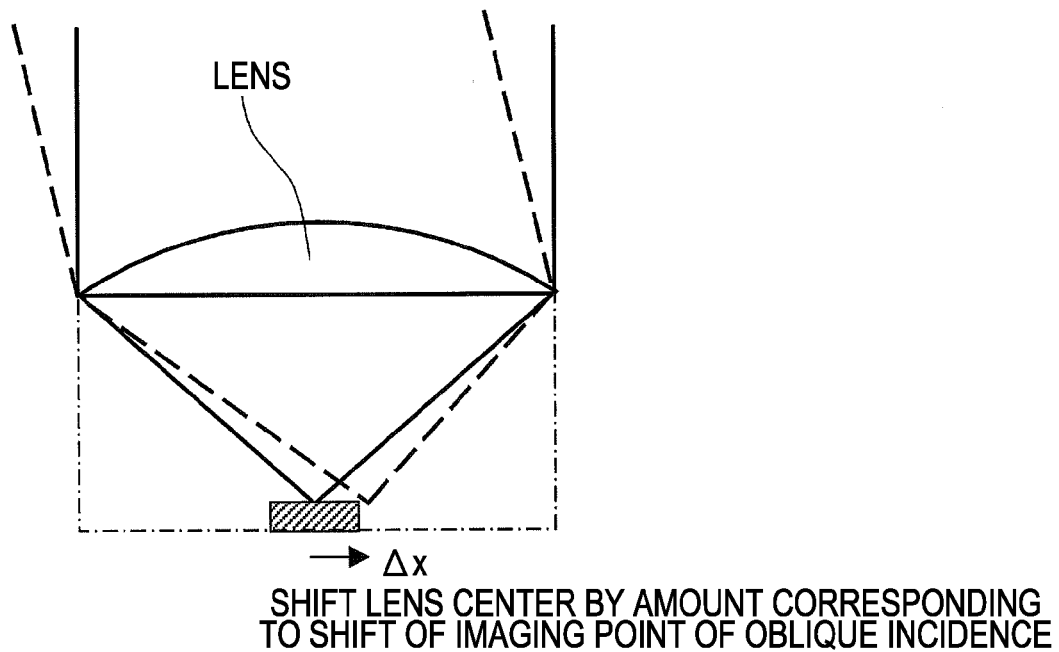
FIGS. 10A and 10B are enlarged drawings showing an example of exposure light for forming the reverse shapes of a plurality of microlenses which constitute a microlens array.
Figure 10B:
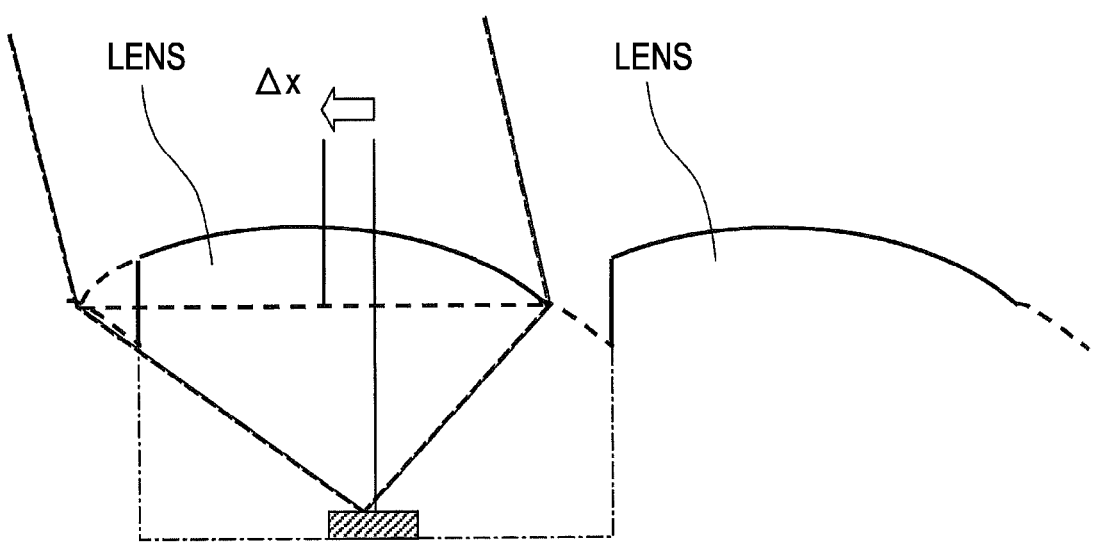

For example, as shown in FIG. 10A, the lens center may be shifted by an amount corresponding to a shift Δx of an imaging point of oblique incidence. In other words, as shown in FIG. 10B, each of the lenses shown in the periphery of FIG. 9 is formed by shifting its lens center from the original center toward the center side of the drawing by an amount corresponding to the shift Δx.

In the above-described method for manufacturing the microlens according to the second embodiment, when the microlens mold 10 is formed, light exposure is used without using electron beam exposure, and the inorganic resist film 12 formed on the mold substrate 11 is irradiated with the exposure light L which is modulated by the spatial modulator 51 to the beam profile corresponding to the reverse shape 13 of a microlens to be formed. As a result, the desired reverse shape 13 of the microlens is obtained by exposure in a two-dimensional plane of the inorganic resist film 12.

Therefore, the desired reverse shape 13 of the microlens is formed in the microlens mold 10.

During etching, the depth of the reverse shape 13 of the microlens may be controlled by controlling the etching conditions.

Therefore, the microlens formed with the microlens mold 10 has a shape close to or equal to a design shape, and there is thus the advantage that the condensation characteristics of the microlens are improved.

Further, light exposure is used without using electron beams, thereby decreasing the cost of the exposure device and the cost of the manufacturing process. Since the intensity of the exposure light L is directly controlled, a mask may not be used, thereby simplifying the manufacturing process.

Next, a method for manufacturing a solid-state image sensor according to an embodiment is described with reference to manufacturing steps shown in FIGS. 11A to 14. Although a CCD solid-state image sensor is described as an example, microlenses of a CMOS solid-state image sensor may be formed by the same method as that for forming microlenses of a CCD solid-stage image sensor.

In a usual process for manufacturing a solid-state image sensor, as shown in FIG. 11A, pixel-separating regions (not shown), light-receiving portions 72, charge-reading portions 73, charge transfer portions 74 including charge transfer electrodes, and the like are formed on a semiconductor substrate 71, and then a light-transmitting insulation film 75 is formed over the entire surface. Further, a light shielding film 77 having apertures 76 formed above the light-receiving portions 72 is formed. Further, a light-transmitting planarizing insulation film 78 is formed, and then a color filter layer 79 is formed.

Next, as shown in FIG. 11B, a lens-forming film 81 is formed on the color filter layer 79. The lens-forming film 81 is composed of, for example, a resist, e.g., an ultraviolet curable resist.

Next, as shown in FIG. 12, the inorganic resist film 12 is pressed on the lens-forming film 81, the inorganic resist film 12 having the reverse shapes 13 of microlenses of the microlens mold 10 formed by the method for manufacturing the microlens according to any one of the above-described embodiments. As a result, the reverse shapes 13 of microlenses of the microlens mold 10 are transferred to form microlenses 82 in the lens-forming film 81.

Next, as shown in FIG. 13, UV light UV is transmitted through the microlens mold 10 to irradiate the lens-forming film 81, curing the lens-forming film 81 in which the microlenses 82 have been formed.

Figure 14:
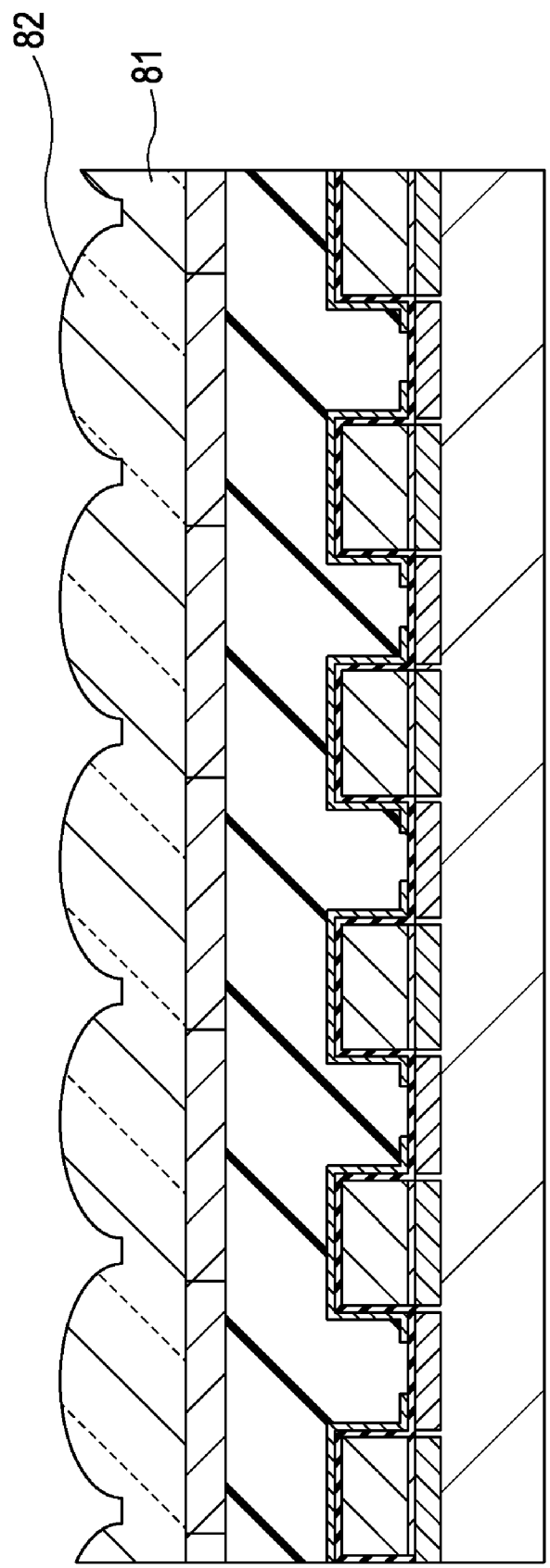
FIG. 14 is a drawing showing a step of a method for manufacturing a solid-state image sensor according to an embodiment.
Figure 15A:
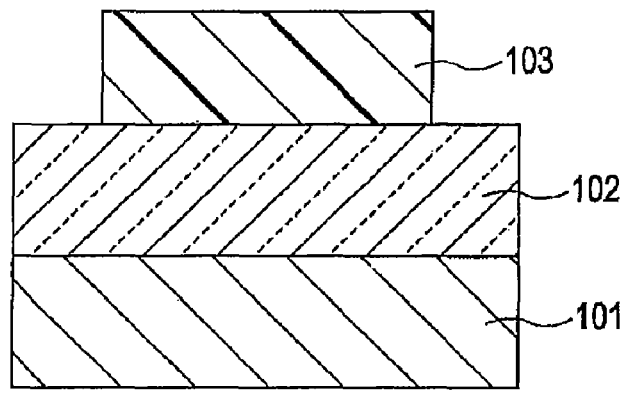
FIGS. 15A to 15C are drawings showing steps of a method for manufacturing a microlens of related art.
Figure 15B:
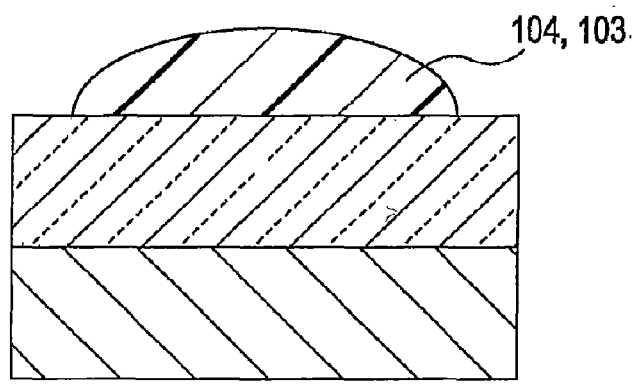
Figure 15C:
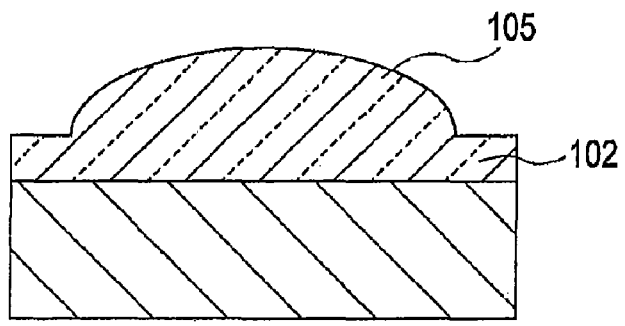

Next, as shown in FIG. 14, the microlens mold 10 (refer to FIG. 13) is separated from the lens-forming film 81 in which the microlenses 82 have been formed. FIG. 14 shows a state after the microlens mold 10 is separated.

In the method for manufacturing a solid-state image sensor according to the embodiment, the microlenses 82 are formed by the method for manufacturing the microlens according to any one of the above-described embodiments. Therefore, the microlenses 82 having a desired shape are formed without using electron beam exposure.

Therefore, the microlenses 82 having excellent condensation characteristics are formed, thereby improving sensitivity of a solid-state image sensor 70.

The above-described method for manufacturing the microlens is applied to the method for manufacturing microlenses of a solid-state image sensor and to a method for manufacturing microlenses used for various electronic apparatuses.

For example, the manufacturing method may be applied to microlenses serving as condensation units for collecting incident light in photoelectric conversion regions in order to improve sensitivity of a primary image sensor used in a facsimile device, or image-forming units.

The manufacturing method may be applied to microlenses for improving luminance of a back light of a transflective liquid crystal display panel. Also, the manufacturing method may be applied to microlenses for increasing luminance by collecting light in regions around pixels in a display device which does not much brighten, such as a liquid crystal display device.

Further, the manufacturing method may be applied to microlenses serving converging units for bonding a light-emitting device or light-receiving device to optical fibers.

Further, the manufacturing method may be applied to microlenses alternative to single-part lenses used for forming an image on a photosensitive medium which is printed by a liquid crystal printer or LED printer.

In a rear-type projector provided with a rear-type projector lens, i.e., a lenticular lens, the manufacturing method may be applied to microlenses used for resolving a problem in which the angle of view in the vertical direction is small while the angle of view in the lateral direction is large.

Further, the manufacturing method may be applied to microlenses serving as focusing plates used for automatic focus detection in a lens shutter camera so that, for example, incident light is uniformly diffused by a lens arrangement with a regular shape to precisely control defocusing.

Further, the manufacturing method may be applied to microlenses used as filters for processing optical information.

Further, the manufacturing method may be applied to microlenses used as optical pick-up elements, for example, optical pick-up units of a laser disk, a compact disk, or a magneto-optical disk.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for manufacturing microlenses comprising:
    forming a plurality of microlenses by pressing a microlens mold having a reverse shape of the microlenses formed therein on a microlens-forming film formed on a substrate to transfer the reverse shape of the microlenses to the microlens-forming film,
    wherein the microlens mold is formed by
        irradiating an inorganic resist film which is formed on a mold substrate with exposure light by relative two-dimensional scanning, an intensity profile of the exposure light at each irradiation position is determined by controlling an angle of a galvano mirror that is positioned in an optical path of the exposure light based on the irradiation position, and by controlling an irradiation intensity of the exposure light based on the irradiation position, and
        forming each reverse shape of the microlens by etching an exposed region of the inorganic resist film to form the reverse shape of the respective microlens, and
    wherein the irradiation intensity of the exposure light and the angle of the galvano mirror are changed at least once to correspond to the depths of different reverse shapes of the microlenses from the surface of the inorganic resist film on the basis of profile data of the reverse shapes of the microlenses.

2. The method for manufacturing the microlens according to claim 1, wherein when the inorganic resist film is relatively two-dimensionally scanned with the exposure light, scanning with the exposure light in an X-axis direction is performed at each time the substrate on which the inorganic resist film has been formed is moved in a Y-axis direction perpendicular to the X-axis direction.

3. The method for manufacturing the microlens according to claim 1, wherein the depths of the reverse shapes of the microlenses are controlled by controlling etching conditions for the inorganic resist film.

4. A method for manufacturing a solid-state image sensor comprising:
    forming microlenses on the incidence side of a light-receiving portion for photoelectric conversion of incident light, the microlenses being adapted for condensing the incident light on the light-receiving portion;
    wherein the microlenses are formed by pressing a microlens mold having a reverse shape of the microlenses formed therein on a microlens-forming film formed on the incidence side of the light-receiving portion to transfer the reverse shapes of the microlenses to the microlens-forming film,
    wherein the microlens mold is formed by
        irradiating an inorganic resist film which is formed on a mold substrate with exposure light by relative two-dimensional scanning, an intensity profile of the exposure light at each irradiation position is determined by controlling an angle of a galvano mirror that is positioned in an optical path of the exposure light based on the irradiation position, and by controlling an irradiation intensity of the exposure light based on the irradiation position, and
        forming each reverse shape of the microlens is formed by etching an exposed region of the inorganic resist film to form the reverse shape of the respective microlens, and
    wherein the irradiation intensity of the exposure light and the angle of the galvano mirror are changed at least once to correspond to the depths of different reverse shapes of the microlenses from the surface of the inorganic resist film on the basis of profile data of the reverse shapes of the microlenses.

5. The method for manufacturing the microlens according to claim 1, wherein the inorganic resist is composed of molybdenum oxide, or tungsten-molybdenum alloy oxide.

6. The method for manufacturing the microlens according to claim 1, wherein the exposure light emitting from a light source is passed through an optical system including a collimator lens, a beam shaping unit, the galvano mirror, and a condensing unit in that order.

7. The method for manufacturing the microlens according to claim 1, wherein in addition to the two-dimensional scanning of exposure light performed over the inorganic resist film during formation of the microlens mold, the galvano mirror enables a secondary scanning of the exposure light at a formation location of each of the microlenses.

8. The method for manufacturing the microlens according to claim 1, wherein an exposure control unit converts coordinate positions of the relative two-dimensional scanning, which is stored in a memory, to a galvanic driving signal and commands a galvano driving unit to drive the galvano mirror on the basis of the command.

9. The method for manufacturing the microlens according to claim 1, wherein the irradiation intensity of the exposure is controlled without using a mask.

* * * * *